Feb. 15, 1949.  M. J. CARPINELLA  2,462,035
MACHINE FOR LOCATING SCREW HEADS
WITH RESPECT TO DRILLS
Filed April 12, 1945
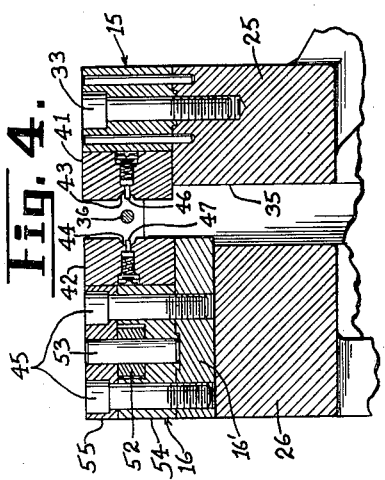
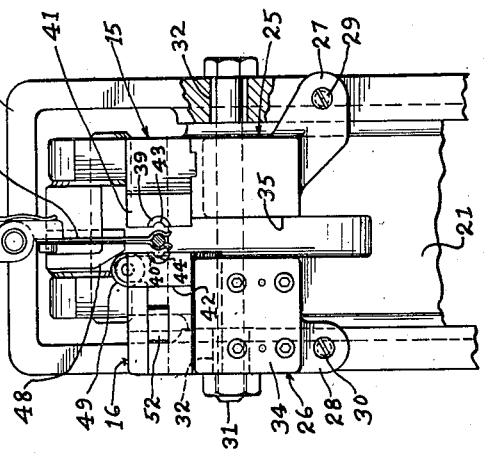
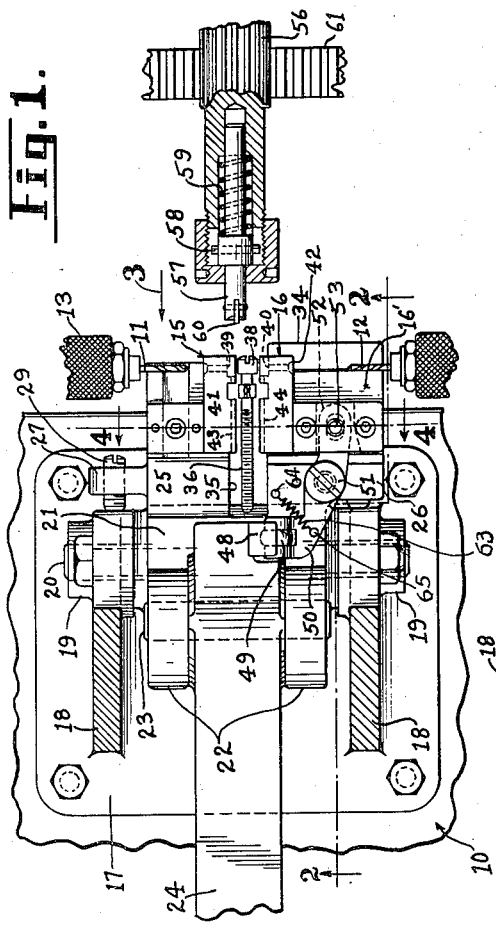
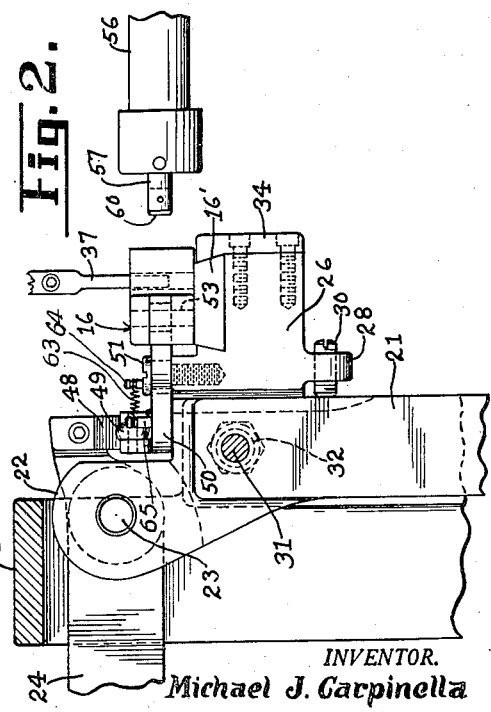
INVENTOR.
Michael J. Carpinella
BY
Howard Thompson Patented Feb. 15, 1949

2,462,035

UNITED STATES PATENT OFFICE 2,462,035

MACHINE FOR LOCATING SCREWHEADS WITH RESPECT TO DRILLS

Michael J. Carpinella, Waterbury, Conn., assignor to Scovill Manufacturing Company, Waterbury, Conn., a corporation of Connecticut Application April 12, 1945, Serial No. 588,006

3 Claims. (Cl. 77—21)

1

This invention relates to machines for drilling heads of screws and similar devices. More particularly, the invention is concerned with machines of this type and kind employing means for locating or positioning the screw or other device with respect to cross drills in the operation of drilling the screws or other devices and in discharging the devices from the machine. Still more particularly, the invention deals with means of the kind defined adapted to care for comparatively long screws or other devices or workpieces.

The novel features of the invention will be best understood from the accompanying drawing, in which certain embodiments of the invention are disclosed and, in which, the separate parts are designated by suitable reference characters in each of the views and in which:

Fig. 1 is a sectional plan view of a part of a drilling machine made according to my invention.

Fig. 2 is a section substantially on the line 2—2 of Fig. 1.

Fig. 3 is a front view looking in the direction of the arrow 3 of Fig. 1 with part of the construction omitted; and Fig. 4 is a section on the line 4—4 of Fig. 1 on an enlarged scale.

The drilling machine forming the subject matter of this application is generally of the type and kind disclosed in my prior application Ser. No. 568,540; filed December 16, 1944, and now abandoned of which this application constitutes a continuation-in-part. In view of the fact that my present conception is concerned primarily with the feed of the screw or other workpiece into the machine and for positioning the screw head preparatory to the drilling operation, only such parts of the present machine as are necessary to illustrate these changes are shown, as the other details of construction form the subject matter of the said prior application and are fully and completely shown therein.

In machines of the type and kind under consideration, the purpose is to drill a screw or other workpiece to provide apertures therein or passages therethrough. In illustrating one adaptation of this invention, it is shown for the purpose of cross drilling fillister head screws and, in such instances, it is desirable to aline the slot of the screw head in predetermined position between the drills so as to form bores or passages in the heads of the screws which are arranged perpendicularly to the kerf or slot in the screw head.

In the accompanying drawing, 10 represents part of the table or frame of a machine of the kind under consideration. In Fig. 1, 11 and 12 represent the two drills supported in suitable chucks 13 and 14, parts of which are shown, for forming the cross drilling operation, these drills being actuated in the manner more specifically disclosed in the application heretofore referred to.

At 15 is shown the stationary screw or workpiece clamping jaw and 16 shows the movable jaw, these jaws being suitably apertured to form guides for the drills 11 and 12, as known in this art.

Arranged upon the table or frame 10 of the machine is a supporting member 17 including an upstanding or U-shaped frame 18. The lower forward portion of this frame has enlarged bosses or bearings 19, note Fig. 1, in which is arranged a pivot pin 20 for pivotally supporting a swingable bracket 21 therein. The upper end of the bracket 21 has an offset yoke portion 22, to which is pivoted, as seen at 23, a clamping arm 24. The bracket 21 has at its upper end two forwardly directed extensions 25 and 26. These extensions have projecting ears 27 and 28, note Fig. 3, in which are arranged adjustment screws 29 and 30 operating upon the face of the frame 18 in controlling the swinging adjustment of the bracket 21 for properly positioning the jaws 15 and 16 with respect to the drills 11 and 12. The bracket 21 is held in the desired adjusted position by a transverse bolt 31 which passes through enlarged apertures 32 in the side members of the frame 18 and through the bracket, as clearly illustrated in Figs. 2 and 3 of the drawing.

The stationary clamping jaw 15 is secured to the extension 25 by a bolt 33, as clearly seen in Fig. 4 of the drawing, whereas the movable jaw 16 has a dovetailed base 16', note Fig. 2, for slidable mounting upon the extension 26, a retainer plate 34 being employed to guide the movable jaw 16, as clearly seen in Fig. 2.

It is clearly seen from a consideration of Figs. 1, 3 and 4 of the drawing that the adjacent surfaces of the extensions 25 and 26 are widely spaced apart to form a channel or passage 35 therebetween which extends the full length of the extensions and opens upwardly, downwardly and outwardly therethrough. This construction provides for the reception of a relatively long screw or workpiece 36, as will clearly appear from a consideration of Fig. 1 of the drawing and facilitates downward movement of the screw by a suitable feed, the gripper fingers of which are illustrated at 37 in Figs. 1, 2 and 3 of the drawing. This feed is so constructed as to faciltate delivery of the head 38 of the screw in proper position between the jaws 15 and 16, particularly with respect to head receiving recesses 39 and 40 of the jaw plates 41 and 42 of said jaws. The recesses 39 and 40 are shown in full lines in Fig. 3 and are indicated in dotted lines in Fig. 1 of the drawing.

Spring pressed ejector pins 46 and 47 are arranged in the recesses 43 and 44 to eject the screw or workpiece 36 from the plates when the clamping jaws are separated and the screw or workpiece 36 will, thus, drop by gravity through the channel or opening 35 into a suitable receptacle not shown. The screw 33 secures the various parts of the stationary jaw to the extension 25, whereas screws 45 are employed for securing the various parts of the movable gripper jaw 16 to the slide 16', as clearly illustrated in Fig. 4 of the drawing.

The clamping arm 24, beyond the pivot 23, carries a cam plate 48 which is adapted to operate upon a roller 49 supported upon one end of a lever 50 pivoted to the extension 26, as seen at 51. The other end 52 of the lever is coupled with the sliding jaw 16 through the medium of a pin 53, note Fig. 4. The sliding jaw 16 comprises, in addition to the plate 40, a dovetailed base 16', a yoke-shaped spacing member 54 and a top plate 55. The base, spacing member and plate are held together by the screws 45, as clearly shown in Fig. 4 of the drawing. The yoke-shaped contour of the spacing plate 54 is to receive the end 52 of the lever. It will, thus, be seen that, in swinging the clamping arm 24 upwardly, the cam plate 48 is moved downwardly, thus, swinging the lever 50 on its pivot 51 to move the clamping jaw 16 into abutting engagement with the stationary jaw 15 to clamp a screw 36 therebetween.

Normally, arranged outwardly of the jaws 15 and 16 and in axial alinement with the screw receiving recesses or apertures of the jaw plates 41 and 42, when the jaws are in closed position, is a blank orienting mechanism generally of the same type and kind as disclosed in the prior application hereinbefore referred to. This mechanism comprises an elongated pinion 56 carrying at its free end a spindle 57 slidably keyed to the pinion, as seen at 58, and having a spring 59 normally urging the spindle outwardly. The free outer end of the spindle carries a blade 60 adapted to engage the screw driver slot in the head 38 of the screw.

In Fig. 1 of the drawing, I have shown at 61 a part of a rack operatively engaging the pinion 56 and movable transversely with respect to the axis of said pinion in order to rotate the spindle to bring the screw driver slot of the head 38 in proper position with respect to the axis of the drills 11 and 12. As in the application heretofore referred to, the pinion 56 and spindle 57 are advanced in the direction of the screw head when the clamping jaws have engaged the head of the screw so as to bring the blade 60 into engagement with the slot of the head 38 as the spindle is rotated and this operation continues until the spindle is brought to a stop properly positioning or orienting the head 38 between said drills. At this particular moment, a final operation may be performed on the clamping arm 24 to effect a final squeeze or clamping engagement upon the screw during the drilling operation.

In the above description operation of engaging the screw, it will be understood that the feed fingers 37 are released from the screw and the support or arm 62 carrying the fingers is moved upwardly to again pick up and deliver the next successive screw to the drilling position. These latter operations are performed during the drilling operation of the screw supported in the clamping jaws. It will be apparent that the machine is entirely automatic in operation and the operation of intermittent delivery of screws to the clamping position, the clamping of the screws and then drilling the same is repeated, the spindle 57 being intermittently moved toward and from the clamping jaws in these intermittent operations.

From a consideration of Fig. 1 of the drawing, it will appear that the jaws 15 and 16 have clearances for the grippers 37 to allow removal of the grippers when the jaws or the plates 41 and 42 are in abutting relationship.

Considering Figs. 1 and 2 of the drawing, it will appear that a spring 63 is employed for supporting the roller 49 in constant engagement with the cam plate 48 and to move the jaw 16 into open position. The spring has one end attached to a fixed post 64 and to a post 65 screwed to the lever 50.

Having fully described my invention, what I claim as new and desire to secure by Letters Patent is:

1. In a cross-drilling machine employing a pair of drills arranged in common alinement and movable toward and from each other for drilling a workpiece disposed in the path of movement of said drills, a pair of workpiece clamping jaws, one of said jaws being fixed, the other jaw being slidably mounted to move toward and from the fixed jaw, both jaws having axially alined drill receiving apertures, means for automatically delivering a workpiece into position between the apertured portions of said jaws, means engaging the workpiece arranged between the jaws to rotate the same into predetermined stop position, spaced supports for said jaws, the spacing of said supports providing a channel beneath said jaws through which a workpiece held in said jaws is adapted to fall by gravity when said jaws are separated, and means in the jaw members for ejecting the workpiece therefrom when said jaws are separated.

2. In machines for drilling workpieces, a fixed jaw, a sliding jaw movable toward and from the first jaw, said jaws having alined sockets for reception of a workpiece to be supported thereby, the jaws having alined apertures opening into the jaw sockets for reception of drills for drilling that part of a workpiece disposed in registering position with the apertures of said jaws, means for automatically delivering a workpiece into position between the jaws when in open position, said jaws having supports, the jaws including the supports forming channels therebetween when the jaws are in open position for gravity discharge of a drilled workpiece therethrough, means engaging a workpiece supported in the jaws for rotating the same to predetermined alinement between the apertures of said jaws, and means for freeing the drilled workpiece from the jaw sockets upon separation of said jaws.

3. In machines for cross-drilling workpieces, a fixed jaw, a movable jaw having rectilinear movement toward and from the fixed jaw, said jaws having supports, means providing an elongated channel between the supports and said jaws for receiving elongated workpieces to be drilled in said jaws, said jaws having workpieces receiving sockets on adjacent surfaces thereof, means for automatically delivering elongated workpieces into registering position with the sockets of said jaws when in open position, means for closing the jaws to engage the registered workpiece supported therebetween, means for rotating a workpiece supported in the sockets of said jaws to predetermined stop position, a pair of drills movable through both jaws in drilling the workpiece supported therebetween, said workpiece rotating means comprising a plunger movable axially toward and from one end of the workpiece supported in said jaws, and means for freeing a workpiece from the jaws for gravity discharge through said channel in the separation of said jaws.

MICHAEL J. CARPINELLA.

REFERENCES CITED

The following references are of record in the file of this patent:

UNITED STATES PATENTS

| Number | Name | Date |
| --- | --- | --- |
| 1,816,225 | Kamphausen | July 28, 1931 |
| 2,004,540 | Smith et al. | June 11, 1935 |
| 2,369,869 | Testo | Feb. 20, 1945 |
| 2,390,420 | Burke | Dec. 4, 1945 |